(No Model.)
N. B. MARSTON.
WEIGHING FORK.
No. 436,427. Patented Sept. 16, 1890.
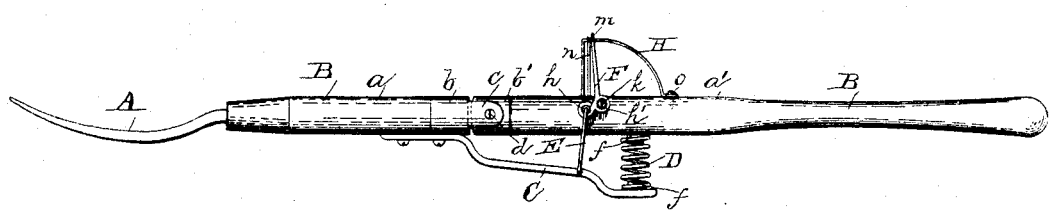
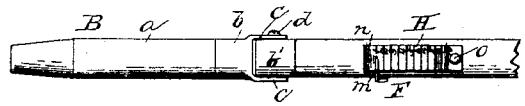
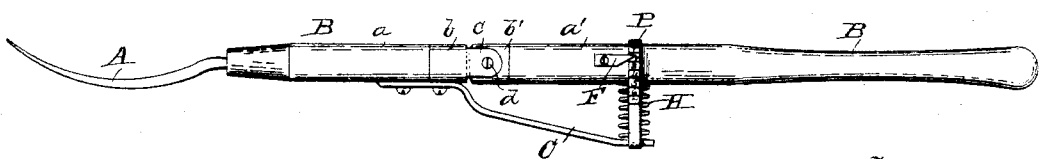
Witnesses
Jos. H. Blackwood
Albert B. Blackwood
Inventor
Nathaniel B. Marston
per
E. H. Cragin
Attorney

UNITED STATES PATENT OFFICE.

NATHANIEL B. MARSTON, OF LEBANON, NEW HAMPSHIRE.

WEIGHING-FORK.

SPECIFICATION forming part of Letters Patent No. 436,427, dated September 16, 1890.

Application filed April 19, 1890. Serial No. 348,632. (No model.)

*To all whom it may concern:*

Be it known that I, NATHANIEL B. MARSTON, a citizen of the United States, and a resident of Lebanon, county of Grafton, State of New Hampshire, have invented a new and useful Improvement in Weighing-Forks, of which the following is a full, clear, and exact description, such as will enable those skilled in the art to make and use the same, reference being had to the drawings, forming a part of this specification.

The object of my invention is to provide an improved fork for weighing the hay, &c., fed to horses or cattle, or to be used as convenience or occasion demands.

The nature of my invention will be described below and pointed out in the claims.

In the drawings, Figure 1 is a side view of the preferred form of the fork. Fig. 2 is a plan view of the same, both ends of the fork-handle being broken away. Fig. 3 is a side view of a modification.

Like letters refer to like parts.

A represents the fork, and B the handle. The latter is composed of two sections $a$ $a'$, jointed together, as shown, section $a$ being the shorter. The lower end of said section carries the fork, and the upper or rear end may be surrounded by a metallic ferrule $b$, from which may project metallic ears $c$ $c$, forming a socket for the forward end of section $a'$, which may also have a metallic ferrule $b'$. By passing a pin $d$ through said ears and the front end of section $a'$ the two sections of the handle B will be strongly jointed together; but I do not wish to be limited to the exact construction shown in forming this joint.

From the under side of section $a$ extends rearward under section $a'$ a curved or bent brace or steel spring C, and upon this is seated a spiral spring D, the upper end of the spring resting under section $a'$. The spring may be held in place by round blocks $f$ $f$, seated on the brace C and section $a'$, as shown.

At one side of the brace and in front of the spring is attached a rigid arm E, the upper end of which engages with an eye $h$ of the pointer F, turning on a pin by means of an eye $h'$, the pin $k$ passing transversely through section $a'$. The upper end of the pointer is bent over horizontally at $m$ above the indicator or scale H, which may rest, as shown, upon section $a'$, the rod $n$ and pin $o$ holding said scale firmly in position.

Upon the face of the indicator are transverse lines in connection with figures such as are likely to indicate the weights in the scope of the device, the surface of said indicator comprising about one-quarter of the circumference of a circle and being always in easy range of the eye.

In the modification, Fig. 3, the pointer is rigidly attached to section $a'$, and the lines indicating weight are upon one side of a yoke P, which surrounds said section and the inner end of brace C, the spring being located as above. It will now be seen that as soon as the section $a$ is pressed down the weight will be transmitted to the spring and the number of pounds shown by the scale H and pointer F or by the rigid pointer and the moving yoke P.

The arrangement shown is simple, effective, and strong, and the jointed handle is as convenient as the ordinary integral handle, which is not the case in certain forks of this character.

Having fully described my invention, what I claim, and desire to secure by Letters Patent, is—

1. In a weighing-fork, the combination, with the jointed handle, of the brace located under said handle, the spiral spring seated on the brace, the pointer, and the weight-indicator, as set forth.

2. In a weighing-fork, the combination, with the jointed handle, of the brace located under the handle, a spiral spring between the brace and handle, the rigid arm E, the moving pointer F, and the rigid indicator H, as set forth.

3. In a weighing-fork, the handle B, composed of sections of different lengths jointed together by lateral ears $c$ and pin $d$, combined with means, substantially as shown, for transmitting and indicating the weight resting on the fork, as set forth.

In witness whereof I have hereunto affixed my signature.

NATHANIEL B. MARSTON.

Witnesses:
G. M. DUDLEY,
C. E. COOPER.